(12) United States Patent
Kohla et al.

(10) Patent No.: US 6,673,437 B2
(45) Date of Patent: Jan. 6, 2004

(54) LUMINESCENT COATING COMPOUND

(75) Inventors: Michael Kohla, Havixbeck (DE); Christoph Frigge, Sprockhövel-Hasslinghausen (DE)

(73) Assignee: Jackstädt GmbH, Wuppertal (DE)

( * ) Notice: Subject to any disclaimer, the term of this patent is extended or adjusted under 35 U.S.C. 154(b) by 0 days.

(21) Appl. No.: 09/960,721

(22) Filed: Sep. 24, 2001

(65) Prior Publication Data

US 2002/0076550 A1 Jun. 20, 2002

(30) Foreign Application Priority Data

Sep. 25, 2000 (DE) .......................................... 100 47 677

(51) Int. Cl.$^7$ ................................................ B32B 5/16
(52) U.S. Cl. .................... 428/332; 428/204; 428/297.4; 427/397.5; 427/397.7; 264/21; 264/103; 264/129; 264/168
(58) Field of Search .............................. 428/204, 297.4, 428/914, 332; 427/393.5, 397.7; 264/21, 103, 129, 168

(56) References Cited

U.S. PATENT DOCUMENTS

| 5,223,330 A | * | 6/1993 | Vockel ........................ 428/204 |
| 5,674,437 A | * | 10/1997 | Geisel .......................... 264/21 |
| 6,165,609 A | * | 12/2000 | Curatolo ...................... 428/343 |
| 6,246,061 B1 | * | 6/2001 | Ramsey et al. ........... 250/458.1 |

FOREIGN PATENT DOCUMENTS

| DE | 91 17 086 U1 | 11/1995 |
| DE | 195 10 468 A1 | 9/1996 |
| DE | 195 49 374 A1 | 2/1997 |
| DE | 195 39 315 A1 | 4/1997 |
| DE | 198 02 588 A1 | 7/1999 |
| EP | 0 594 765 B1 | 10/1997 |

* cited by examiner

*Primary Examiner*—Leszek Kiliman
(74) *Attorney, Agent, or Firm*—Nixon Peabody LLP; David S. Safran

(57) ABSTRACT

A luminescent coating compound of organic binder and luminescent fibers containing at least one organic binder and fibers which of a fiber-forming material with at least one luminescent dye or pigment distributed therein. Also a process of producing coatings of such compounds and articles with such coatings.

35 Claims, No Drawings

LUMINESCENT COATING COMPOUND

BACKGROUND OF THE INVENTION

1. Field of the Invention

This invention relates to a luminescent coating compound. In particular, this invention relates to a coating compound of binders and luminescent fibers, and to the use of this coating compound, especially to identify articles.

2. Description of Related Art

The term "luminescence" is defined as the light emission produced by gases, liquids or solids after suitable energy supply, and the emitted light can be in the visible range, in the UV range, and/or in the infrared range. Two forms of luminescence can be distinguished, specifically fluorescence and phosphorescence. For details, refer to the Roempp Lexikon Chemie, 10th edition, key word "Luminescence", "Fluorescence" and "Phosphorescence" and to the bibliography cited there.

Coatings into which luminescent dyes or pigments have been uniformly incorporated are commercially available. Thus, cements with fluorescent dye pigments are used for optical detection of labels. However, these coatings are not used for security identifications since they are relatively nonspecific. In paper and textile coatings, their emission would moreover be overwhelmed by the whiteness (OBA) which are generally contained in them. In addition, the amounts of fluorescent dyes to be used are relatively large in this case.

Published German Patent Application Nos. 195 10 468 and 195 49 374 disclose a transparent film which fluoresces continuously in daylight, the fluorescence effect being produced by color pigments in larger amounts being incorporated into the fluorescing film, distributed uniformly over the entire film. A similar, continually fluorescing transparent adhesive film material which is dyed with larger amounts of a fluorescing dye distributed over the entire film is described in German Utility Model 91 17 086 and in European Patent No. 0 594 765.

However, the above described films are not suited for security identification, being designed to produce an optical effect which is used preferably for advertising purposes, because these films exhibit continuous luminescence which is detectable with the naked eye. Furthermore, a relatively large amount of dye pigments is necessary to produce the luminescence effect distributed uniformly over the entire film.

SUMMARY OF THE INVENTION

A primary object of this invention is to provide a system which enables identification of articles. Here, the ability of certain substances to luminesce will be used. In particular, the system will make it possible to impart a security or identification function.

The subject matter of this invention is a coating compound which contains at least one organic binder and luminescent fibers, the luminescent fibers being formed of a fiber-forming material with at least one luminescent dye or pigment distributed in it.

The coating compound in accordance with the invention can be used to identify articles of all types by applying the coating compound to the surface of these articles.

The organic binder can be binders of all types. The organic binder must, however, be chosen such that the luminescent pigments or dyes are not attacked and are not dissolved by the fibers. This also applies to other substances contained in the coating compound, especially to solvents possibly contained in the coating compound. Examples of suitable organic binders are varnishes of all types, especially clear varnish. The organic binder can also be paper or film coating slips. Furthermore, the organic binder can be cements of all types; example of the cements under consideration are contact adhesives, for example, solvent-based contact adhesives, dispersion-based contact adhesives or hot-melt adhesives. The organic binder used in the coating compound in accordance with the invention is especially a clear, i.e., transparent or essentially transparent organic binder. However, it is also possible to use cloudy to opaque binders, especially when the coating compound is applied thinly and the fibers "come out" of the coating.

The luminescent fibers used in accordance with the invention are known (see, published German Patent Application Nos. 195 39 315 and 198 02 588 and U.S. Pat. No. 5,674,437) and are commercially available. Producers of these fibers include Honeywell, Specialty Chemicals, previously Riedel-de-Haen, which markets a host of luminescent fibers under the trademark LUMILUX®, the luminescent dye pigments distributed in the fibers, depending on the molecule, emitting light of different wavelength or color (for example, fibers of type LUMILUX® Blue MF-P 831/22/3-LT, LUMILUX® Red MF-P-870/LT, LUMILUX® Yellow MF-P 833/22/3-LT).

For a long time, fibers of the aforementioned type had been incorporated into fibrous materials like paper or textiles in their manufacture; in paper production, these fibers are added to the pulp, and in textile production, to the raw material from which the fibers are spun. This results in relatively large production batches. The luminescent fibers in these products are only used as a security feature which is hard to falsify, for example, for currency. The basis of these fibers is silk, cellulose, cellulose acetate, polyamides, polyesters; they are dyed with organic or inorganic luminescent dyes (see, published German Patent Application Nos. 195 39 315 and 198 02 588 and U.S. Pat. No. 5,674,437). In the prior art, these fibers were not used to produce functional coatings.

Production of the luminescent fibers used in accordance with the invention is known from the prior art. Reference can be made once again to published German Patent Application Nos. 195 39 315 and 198 02 588 and U.S. Pat. No. 5,674,437.

In the production of luminescent fibers, the procedure is generally that the luminescent dye is added to the fiber-forming material or a solution of it and the fibers are spun from it. It is also possible to bring the fibers or the fiber-forming material into contact with a solution or dispersion of the luminescent dye (for example, by spraying, immersion, impregnation, etc.), and to dry the fibers obtained in this way.

The amount of luminescent fibers used in the coating compound in accordance with the invention and the composition of the fibers, especially the length and thickness of the fibers and the type of fiber material and the dye, are matched such that the coating process is not disturbed. On the other hand, however, it must be possible to achieve an identification function.

Generally, the coating compound according to the invention, relative to 100 parts by weight of the coating compound, contains 0.0001 to 10 parts by weight, especially 0.001 to 7.5 parts by weight, preferably 0.001 to 5 parts by weight, of luminescent fibers. The length of the luminescent fibers used in accordance with the invention can vary within wide limits and is generally in the range from 0.05 to 10 mm, especially in the range from 0.1 to 5 mm. This thickness of the luminescent fibers used can likewise vary within wide limits and is typically in the range from 1 to 1,000 microns, especially in the range from 10 to 100 microns.

The fiber-forming material can be all known fiber-forming materials if they are compatible with the coating compound of the invention. Examples of suitable fiber-forming materials are silk, cellulose, cellulose acetate, polyamides, polyesters, polyacrylates, polyolefins, polyurethanes, cotton and mixtures of the aforementioned materials. The fibers used contain the luminescent dye or the luminescent pigment typically in an amount of more than 5 to 50% by weight, especially from 7 to 40% by weight, preferably 10 to 20% by weight, relative to the total weight of the fibers.

The luminescent dye or the luminescent pigment can be of an organic or inorganic nature. In particular, the luminescent dye or luminescent pigment can at least partially exhibit a luminescent effect when excited with ultraviolet radiation. Here, the luminescent effect can be based on fluorescence or phosphorescence.

DETAILED DESCRIPTION OF THE INVENTION

According to one embodiment of the invention the luminescent dye or luminescent pigment is chosen such that it emits in the visible and/or infrared light range when excited with ultraviolet radiation. In particular, the luminescent dye or the luminescent pigment is chosen such that it emits at least in the visible light range when excited with ultraviolet radiation. For example, the luminescent pigment can be an inorganic luminophore. Examples include phosphates, tungstates, oxides, silicates and aluminates of the alkaline earth metals, subgroup elements or rare earths and the halides of the alkali or alkaline earth metals which are doped with one or more activators, for example $Mn^{2+}$, $Mn^{4+}$, $Sb^{3+}$, $Sn^{2+}$, $Pb^{2+}$, $Cu^+$, $Ag^+$, rare earths. Other examples are zinc sulfides, zinc cadmium sulfides, alkaline earth aluminates, alkaline earth sulfides and alkaline earth silicates and their mixtures, each doped with at least one transition metal and/or lanthanoid element. For other examples, refer to published German Patent Application Nos. 195 39 315 and 198 02 588 and U.S. Pat. No. 5,674,437.

The luminescent dye or luminescent pigment can also be an organic luminophore. Examples include luminescent, especially fluorescent, homocyclic or heterocyclic aromatic systems such as luminescent, preferably fluorescent benzene, acridine, xanthene, thioxanthene, pyrene, stilbene, cumarine and pyrazoline derivatives and mixtures of these compounds.

The luminescent dye or luminescent pigment is generally a fluorochrome (fluorescent dye). However, according to the invention, it is also possible for the luminescent dye or luminescent pigment to be a fluorogen which is reacted into a fluorescent chemical compound only by chemical reaction, for example enzymatically catalyzed or even not. The expression "luminescent dye" or "luminescent pigment" as is used within the framework of the invention is defined both as the luminescent dye (pigment) itself and also a suitable precursor which is converted into the luminescent dye (pigment) by chemical reaction.

According to another embodiment of the invention, it is possible to combine different fibers in the coating compound, to which fibers different luminescent dyes or pigments are applied which, after excitation with suitable energy, emit light of different wavelengths or spectral color.

In addition to the organic binder and the luminescent fibers, the coating compound of the invention can, moreover, contain conventional additives, processing aids or conditioners of all types. However, the additives, processing aids or conditioners must be chosen such that the luminescent pigments or dyes are not attacked or dissolved by the fibers. Examples of additives, processing aids or conditioners are fillers, antioxidants, anti-aging agents, additives to protect against UV radiation, flow-influencing additives, solvents and dispersants, emulsifiers or color pigments.

According to one special embodiment of the invention, the coating compound of the invention can contain a selective Uw anti-aging additive which absorbs shortwave sunlight. In this way, the stability or luminescence capacity of the fibers is ensured over longer intervals.

The subject matter of this invention is also a process for producing a luminescent coating on surfaces of plastic, paper, paperboard, cardboard, textiles or metals by applying the coating compound according to the invention. Application to the surface takes place generally with a layer thickness from 0.1 to 1,000 microns, especially from 1 to 500 microns. The coating process is such that, due to the composition of the coating compound according to the invention, especially the amount, length and thickness of the luminescent fibers used, it is not disturbed by the presence of fibers. Preferably, processes such as knife coating, blade coating, roller application, spray application or pouring can be used for the layer thicknesses under consideration here, from 0.1 to 1,000 microns, especially from 1 to 500 microns.

This yields, for example, the following new possible applications:

The coating compound is used especially to produce a luminescent coating on the surface of articles. Almost any types of surfaces can be coated with the coating compound, e.g., surfaces of plastics, paper, paperboard, cardboard, textiles or metals.

The application of the luminescent coating compound can be used to identify articles, i.e., to impart an identification or security function. If the fibers are incorporated into a contact cement, it can be used in combination with transparent films as a laminating film for valuable documents: the laminating film enables efficient production of small and extremely small lot sizes. Small adhesive labels, under certain circumstances in combination with easy-tear safety film, can be used, for example, as safety labels.

In conjunction with the above described coating compounds different color combinations, i.e., combinations of fibers with different luminophore pigments, under UV light enable allocation. In this way, differently labeled objects can easily be unequivocally identified. Furthermore, the luminescent coating compound can also be used to produce an optical effect. If the luminescent fibers are incorporated into a varnish, in conjunction with suitable light sources interesting luminous effects for advertising or product design can be achieved.

The coating compound can be used especially to coat web-shaped materials of all types, such as metal foils or plastic films, especially label films and self-adhesive label films, adhesive tapes, papers, paperboards and cardboards, textiles and fiber materials. The plastic films can be transparent, translucent or opaque colored films.

According to another embodiment the coating compound of the invention can be used in the production of label films.

Label films generally of an actual film layer, with a contact adhesive layer applied to one side, and the layer can be covered with a removable protective paper, for example, silicone-coated or wax-coated paper; optionally the film layer can be additionally coated with a printer's varnish on the side facing away from the contact adhesive layer for greater ease of printing.

A coating compound of contact adhesive, luminescent fibers and optionally conventional additives can be used as the contact adhesive layer; then labels can be obtained from this film, with a contact adhesive layer which has a security function.

Furthermore, it is possible to varnish the label film with a coating compound as claimed in the invention made of varnish, for example, printer's varnish, luminescent fibers, and optionally, conventional additives on the film side facing away from the contact adhesive layer; then labels can be obtained from this film, with a varnish layer which has a security function. The varnish can be a printer's varnish which enables the label film to be printed or improves its capacity to be printed. Of course, in the case of label films both the contact adhesive layer and also the varnish layer which may be present can be produced proceeding from a coating compound as claimed in the invention.

One advantage of the invention is that the luminescent fibers with the luminescent dyes applied to them, compared to uniform dyeing with the luminescent dye particles themselves, enable local concentration of the emission intensity, and thus, better recognizability. This allows use of far lower pigment and dye concentrations overall. In other words, by applying dye pigments to the fiber material high local concentrations of dye with a simultaneous low absolute concentration can be achieved with reference to the coating compound, as can good detectability, i.e., a favorable signal/noise ratio.

By mixing fibers of different luminescent colors and by different mixing ratios of the fibers there is almost unlimited latitude for different codes.

One advantage of incorporating the fibers into a coating compound and the subsequent coating of, for example, paper, textiles, films or other articles is the very much greater versatility. Mainly, small lot sizes can also be economically produced. When using a coating compound according to the invention in the form of a cement or a varnish as the coating, an additional security functions arise.

The amount of fibers in the coating compound and the fiber dimensions are generally such that, when viewed with the naked eye in daylight, the fibers are not recognizable as such or hardly so, for example, in the case of clear, transparent coating compounds in any case they are perceived as slight cloudiness in the coating. Conversely, when excited by a suitable light source, for example, under a UV lamp, the luminescent of the fibers can be detected with the naked eye as a result of the high local dye concentration if dyes are used which emit at least partially in the visible wavelength range after excitation.

The security function can be controlled in almost any manner by the choice of the luminophore. If luminophore pigments which emit only in the IR range after excitation with light of suitable energy are chosen, an additional security function is obtained, since emission is not visible with the naked eye and can be detected only with suitable methods, for example, IR spectroscopy.

This invention is illustrated using the following embodiments which, however, in no way limit the invention.

EXAMPLE 1

Into 100 parts of a solution of polyacrylate contact adhesive in ethyl acetate (solid content: 30%), 0.01 parts of commercial fibers which luminesce under UV irradiation of the type sold as LUMILUX® red MF-P 870/LT type (Honeywell, Specialty Chemicals, previously Riedel-de-Haen) are uniformly stirred. The adhesive is then applied by means of a doctor blade as a thin layer of 200 microns to a PVC film and then dried using hot air. The dried adhesive layer (60 microns) is then covered with silicone-coated paper. After further processing of the adhesive film by cutting or punching, self-adhesive labels or adhesive tapes are obtained, with an adhesive layer which shows red fluorescence in the area of the incorporated fibers when irradiated with UV light. When viewed with the naked eye in daylight, the fibers cannot be recognized as such. However, under a UV lamp the luminescence phenomenon is clearly visible with the naked eye.

EXAMPLE 2

Into 100 parts of a solution of polyacrylate contact adhesive in ethyl acetate (solid content: 30%), a mixture of different commercial fibers which luminesce under UV irradiation, specifically 0.005 parts of luminescent fibers of the type sold as LUMILUX® red MF-P 870/LT, 0.004 parts of luminescent fibers of the type sold as LUMILUX® blue MF-P 871/LT, and 0.002 parts of luminescent fibers of the type sold as LUMILUX® green MF-P 877/LT, are uniformly stirred. The adhesive is then applied by means of a doctor blade as a thin layer of 60 microns to a transparent polyester film and is dried using hot air. The dried adhesive layer (20 microns) is then covered with silicone-coated paper. After further processing of the adhesive film, a self-adhesive laminating film is obtained which locally shows bright fluorescence, depending on the fibers red, blue or green, each in the area of the incorporated fibers when irradiated with UV light. When viewed with the naked eye in daylight, the fibers cannot be recognized as such. However, under a UV lamp the luminescence phenomenon is clearly visible with the naked eye.

EXAMPLE 3

Into 100 parts of an aqueous dispersion of polyacrylate contact adhesive in ethyl acetate (solid content: 50%), a mixture of different commercial fibers which luminesce under UV irradiation, specifically 0.005 parts of luminescent fibers of the type sold as LUMILUX® red MF-P 870/LT, 0.004 parts of luminescent fibers of the type sold as LUMILUX® blue MF-P 871/LT, and 0.002 parts of luminescent fibers of the type sold as LUMILUX® green MF-P 877/LT, are uniformly stirred. The adhesive is then applied by means of an engraving roller as a thin layer of 40 microns to a silicone paper and is dried using hot air. The dried adhesive layer (20 microns) is then laminated with paper so that the adhesive layer is transferred to the paper. After further processing of the adhesive paper, self-adhesive labels are obtained which locally show bright fluorescence (red, blue, or green) in the area of the fibers when irradiated with UV light. When viewed with the naked eye in daylight, the fibers therefore cannot be recognized as such. However, under a UV lamp, the luminescence phenomenon is clearly visible with the naked eye.

EXAMPLE 4

Into 100 parts of a polyester varnish, a mixture of different commercial fibers which luminesce under UV irradiation, specifically 0.007 parts of luminescent fibers of the type sold as LUMILUX® red MF-P 870/LT and 0.003 parts of luminescent fibers of the type sold as LUMILUX® green MF-P 877/LT type, are uniformly stirred. After applying the varnish as a thin layer (20 microns) to various surfaces, after drying, it locally shows red or green fluorescence in the area of the incorporated fibers when irradiated with UV light.

When viewed with the naked eye in daylight, the fibers therefore cannot be recognized as such. However, under a UV lamp the luminescence phenomenon is clearly visible with the naked eye.

What is claimed is:

1. Coating compound containing at least one organic binder and fibers which comprise a fiber-forming material with at least one luminescent dye or pigment distributed therein, wherein the fibers have a length in a range of from 0.05 to 10 mm.

2. Coating compound as claimed in claim 1, wherein the organic binder is selected from the group consisting of varnishes, cements, dispersion-based contact cements, adhesives, and mixtures thereof.

3. Coating compound as claimed in claim 1, wherein the organic binder is transparent.

4. Coating compound as claimed in claim 1, wherein the organic binder is opaque.

5. Coating compound as claimed in claim 1, wherein the organic binder is translucent.

6. Coating compound as claimed in claim 1, wherein the coating compound, relative to 100 parts by weight of the coating compound, contains 0.0001 to 10 parts by weight of fibers.

7. Coating compound as claimed in claim 1, wherein the coating compound, relative to 100 parts by weight of the coating compound, contains 0.001 to 7.5 parts by weight of fibers.

8. Coating compound as claimed in claim 1, wherein the coating compound, relative to 100 parts by weight of the coating compound, contains 0.001 to 5 parts by weight of fibers.

9. Coating compound as claimed in claim 1, wherein the fiber-forming material is selected from the group consisting of silk, cellulose, cellulose acetate, polyamides, polyesters, polyacrylates, polyolefins, polyurethanes, cotton and mixtures thereof.

10. Coating compound as claimed in claim 1, wherein the fibers have a thickness which varies in the range from 1 to 1,000 microns.

11. Coating compound as claimed in claim 1, wherein the fibers have at least one of a length in a range of from 0.1 to 5 mm, and a thickness which varies in the range from 10 to 100 microns.

12. Coating compound as claimed in claim 1, wherein the fibers contain the luminescent dye or pigment in an amount of more than 5 to 50% by weight relative to the total weight of the fibers.

13. Coating compound as claimed in claim 1, wherein the fibers contain the luminescent dye or pigment in an amount of from 7 to 40% by weight relative to the total weight of the fibers.

14. Coating compound as claimed in claim 1, wherein the fibers contain the luminescent dye or pigment in an amount of from 10 to 20% by weight relative to the total weight of the fibers.

15. Coating compound as claimed in claim 1, wherein the luminescent dye or pigment is an organic material.

16. Coating compound as claimed in claim 1, wherein the luminescent dye or pigment is an organic material.

17. Coating compound as claimed in claim 1, wherein the luminescent dye or pigment at least partially yields a luminescence effect when excited with ultraviolet radiation.

18. Coating compound as claimed in claim 1, wherein the luminescence effect is in at least one of the visible light range and infrared light range.

19. Coating compound as claimed in claim 1, wherein the luminescent dye or pigment is an inorganic luminophore.

20. Coating compound as claimed in claim 19, wherein the luminophore is selected from the group consisting of zinc sulfides, zinc cadmium sulfides, alkaline earth aluminates, alkaline earth sulfides and alkaline earth silicates and their mixtures, each doped with at least one of a transition metal and a lanthanoid element.

21. Coating compound as claimed in claim 19, wherein the luminophore is an organic luminophore selected from the group consisting of fluorescent, homocyclic and heterocyclic aromatic systems.

22. Coating compound as claimed in claim 19, wherein the organic luminophore is selected from the group consisting of benzene, acridine, xanthene, thioxanthene, pyrene, stilbene, cumarine, pyrazoline derivatives and mixtures thereof.

23. Coating compound as claimed in claim 1, wherein the luminescent dye or pigment is one of a fluorochrome and a fluorogen which is reacted into a fluorescent chemical compound only by an enzymatically catalyzed chemical reaction.

24. Coating compound as claimed in claim 1, wherein the coating compound further comprises at least one of additives, processing aids and conditioners from the group consisting of fillers, antioxidants, anti-aging agents, UV radiation protectants, flow-influencing additives, solvents and dispersants, emulsifiers, colorants, additives which absorb shortwave sunlight.

25. An article having a luminescent coating on a surface of thereof for at least one identification and an optical effect purposes in which said coating comprises a compound containing at least one organic binder and fibers which comprise a fiber-forming material with at least one luminescent dye or pigment distributed therein wherein the fibers have a length in a range of from 0.05 to 10 mm.

26. An article as claimed in claim 25, wherein the surface is made of a material selected from the group consisting plastics, paper, paperboard, cardboard, textiles, and metals.

27. An article as claimed in claim 25, wherein the article is formed of a web-shaped material.

28. An article as claimed in claim 27, wherein the web-shaped material is selected from the group consisting of metal foils and plastic films.

29. An article as claimed in claim 25, wherein the article is made of one of a label film, adhesive tape, paper, paperboard and cardboard, textile and fiber material.

30. An article as claimed in claim 25, wherein the coating compound has a layer thickness of from 0.1 to 1000 microns.

31. An article as claimed in claim 25, wherein the coating compound has a layer thickness of from 1 to 500 microns.

32. An article as claimed in claim 25, wherein the article is a contact adhesive label.

33. An article as claimed in claim 25, wherein the coating is formed of a luminescent varnish layer.

34. Process for producing a luminescent at least one surface of a plastic, paper, paperboard, cardboard, textile or metal coating on article comprising the steps of applying a coating compound a compound containing at least one organic binder and fibers, which comprise a fiber-forming material with at least one luminescent dye or pigment distributed therein, to a surface with a layer thickness from 0.1 to 1000 microns, wherein the fibers have a length in a range of from 0.05 to 10 mm.

35. Process for producing a luminescent coating according to claim 33, wherein said layer thickness is in a range 1 to 500 microns.

* * * * *